(12) United States Patent
Inaba et al.

(10) Patent No.: US 8,759,708 B2
(45) Date of Patent: Jun. 24, 2014

(54) WIRE-CUT ELECTRIC DISCHARGE MACHINE WITH WIRE ELECTRODE CUTTING FUNCTION

(75) Inventors: Harutora Inaba, Yamanashi (JP); Ryou Nishikawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/449,577

(22) Filed: Apr. 18, 2012

(65) Prior Publication Data

US 2012/0305530 A1 Dec. 6, 2012

(30) Foreign Application Priority Data

May 30, 2011 (JP) .................................. 2011-120347

(51) Int. Cl.
*B23H 7/00* (2006.01)
*B23H 7/14* (2006.01)

(52) U.S. Cl.
USPC ..................................................... 219/69.12

(58) Field of Classification Search
USPC .................. 219/69.12, 69.13, 69.18; 700/162
See application file for complete search history.

(56) References Cited

U.S. PATENT DOCUMENTS

| | | | |
|---|---|---|---|
| 4,618,761 A | | 10/1986 | Inoue et al. |
| 4,736,085 A | * | 4/1988 | Inoue et al. ................. 219/69.12 |
| 4,929,810 A | * | 5/1990 | Kawase ..................... 219/69.12 |
| 5,753,880 A | | 5/1998 | Kajitori et al. |
| 6,627,834 B1 | | 9/2003 | Moro et al. |
| 6,833,523 B2 | * | 12/2004 | Kimura et al. ............. 219/69.12 |
| 7,557,323 B2 | * | 7/2009 | Chang ............................. 219/68 |

FOREIGN PATENT DOCUMENTS

| | | |
|---|---|---|
| EP | 0652067 A1 | 5/1995 |
| EP | 0770444 A1 | 5/1997 |
| EP | 2158993 A2 | 3/2010 |
| JP | 2-95517 A | 4/1990 |
| JP | 6304819 A | 11/1994 |
| JP | 7-178623 A | 7/1995 |
| JP | 2003-285227 A | 10/2003 |
| JP | 2010-52092 A | 3/2010 |
| WO | 99/39859 A1 | 8/1999 |

OTHER PUBLICATIONS

A JP Office Action, dated Aug. 21, 2012, issued in JP Application No. 2011-120347.
Extended European Search Report for corresponding European Patent Application EP 12157446 mailed Sep. 16, 2013.

\* cited by examiner

*Primary Examiner* — Dana Ross
*Assistant Examiner* — Thomas Ward
(74) *Attorney, Agent, or Firm* — Lowe Hauptman & Ham, LLP

(57) ABSTRACT

In a wire electric discharge machine in which chuck part electrodes that hold a wire electrode are provided on the upper side of an upper wire guide and electrodes of a detecting part are provided on a lower stream side of the chuck part electrodes, a part, which contacts with the chuck part electrodes, of a surface of the wire electrode is hardened by locally cooling down the part by air blowing during energization to the wire electrode. Accordingly, wire metal powder is hardly generated from the wire electrode even though the wire electrode rubs against the chuck part electrodes.

9 Claims, 12 Drawing Sheets

COOLING AIR JETTING DIRECTION

TO AIR CYLINDER VALVE

AIR FOR CLEANING WIRE ELECTRODE AND PIPE INSIDE

ANNEALING TORQUE START

ANNEALING ENERGIZATION START

AIR FOR CLEANING WIRE ELECTRODE AND PIPE INSIDE

WIRE-CUT ELECTRIC DISCHARGE MACHINE WITH WIRE ELECTRODE CUTTING FUNCTION

RELATED APPLICATIONS

The present application is based on, and claims priority from, Japanese Application Number 2011-120347, filed May 30, 2011, the disclosure of which is hereby incorporated by reference herein in its entirety.

BACKGROUND OF THE INVENTION

1. Field of the Invention

The present invention relates to a wire-cut electric discharge machine which has a wire electrode cutting function, an automatic wire connecting function, and a disconnection restoring function.

2. Description of the Related Art

A wire electrode cutting operation which is performed in automatic wire electrode connection in wire discharge machining is performed to reproduce an end part of a wire electrode which has a smooth wire electrode surface which is necessary for the connection of the wire electrode during an operation of machining a workpiece. The wire electrode having the smooth wire electrode surface is obtained by cutting and removing a disconnection part of the wire electrode, a bent part of the wire electrode, or a scratched part of the surface of the wire electrode.

To perform the wire electrode cutting operation by annealing is a known technique as disclosed in Japanese Patent Application Laid-Open No. 6-304819, for example. In this technique, after a wire electrode to be annealed is clamped by a pair of energizing electrodes (a chuck part electrode and a detecting part electrode), the wire electrode is energized. Then, cutting tension is generated on the wire electrode, which is softened by heat generated by electric resistance, in a rewinding direction by a break roller and at the same time, tensile cutting is performed while maintaining the heat-generation part on a given position close to a nozzle outlet by cooling air or cooling water inside of an upper pipe. Thus, the cutting operation is completed.

Here, problems of the related art technique in which a cutting operation of a wire electrode is performed by annealing are described with reference to FIGS. 9 to 14.

FIG. 9 illustrates a previous stage of a start of cutting of a wire electrode. As the previous stage of a start of cutting of a wire electrode 11, air blowing is started so as to clean the wire electrode 11 and the inside of an upper pipe 21, as shown in FIG. 9. At this time, a chuck part electrode 20a on an energizing side and a chuck part electrode 20b on a clamping side are in such state that they do not clamp the wire electrode 11. Further, a pair of detecting electrodes 22 constituting a detecting part is in such state that the pair does not clamp the wire electrode 11, as well.

FIG. 10 illustrates an energization start for annealing. When the energization of the wire electrode 11 is started, the wire electrode 11 is clamped by the chuck part electrodes 20a and 20b and is clamped by the detecting electrodes 22 and 22 as illustrated in FIG. 10. Here, the chuck part electrodes 20a and 20b clamp the wire electrode 11 with a relative movable force with respect to the wire electrode 11 in a state that imparting of anneal torque by a break roller 18 is started and the wire electrode 11 is pulled. Then, current for annealing is started to be fed to the chuck part electrodes 20a and 20b and the detecting electrodes 22 and 22 via the wire electrode 11. This current feeding start is called "annealing energization start" hereinafter.

The wire electrode 11 generates heat and is softened by energization. Simultaneously with the annealing energization start, tensile force is imparted to the wire electrode 11 in a rewinding direction by rotary torque of the break roller 18. The tensile force imparted simultaneously with the annealing energization start is called "annealing torque" hereinafter. Here, during the energization for annealing, air supply for cleaning the inside of the upper pipe 21 is stopped and the wire electrode 11 is cooled down by cutting air so as to control a cutting position and straightness of the wire electrode 11. The flowing amount per unit time of the cutting air for cooling down to straighten the wire electrode 11 is smaller than that of the cleaning air.

FIG. 11 illustrates a process from annealing start to cutting. In order to increase tensile force which is imparted to the wire electrode 11, the annealing torque is switched to the cutting torque, as shown in FIG. 11. The cutting torque is imparted by controlling the rotary torque of the break roller 18 so that the wire electrode 11 is pulled in the rewinding direction, as is the case with the annealing torque. The cutting torque is larger than the annealing torque. Further, the cleaning air for cleaning the inside of the upper pipe 21 and the wire electrode 11 is switched to the cutting air. The wire electrode 11 which is annealed and softened is further stretched by the cutting torque and at this time, the wire electrode 11 rubs against the chuck part electrode 20a on the energizing side and the chuck part electrode 20b on the clamping side. Thus, the wire electrode 11 rubs against the chuck part electrodes 20a and 20b. Accordingly, wire metal powder derived from the wire electrode 11 is attached to surfaces of the chuck part electrodes 20a and 20b.

Then, the wire electrode 11 is wound up by the cutting torque and is cut at a part on the electrodes of the detecting part. Almost all part of the wire electrode 11 between the chuck part electrodes 20a and 20b and the electrodes of the detecting part 22 penetrates through the inside of the upper pipe 21 and is cooled down by the cutting air which flows inside the upper pipe 21. Therefore, the wire electrode 11 is not cut inside the upper pipe 21 and is cut at a part on the electrodes of the detecting part 22.

FIG. 12 illustrates a process from a cutting end to a connection start of the wire electrode 11. When the cutting of the wire electrode 11 is ended, wire feeding of the wire electrode 11 is started in a winding direction 15. At this time, the wire electrode 11 rubs against the chuck part electrodes 20a and 20b, so that wire metal powder is attached to the surfaces of the chuck part electrodes 20a and 20b.

In the above-described technique, when the wire electrode 11 which has been annealed is pulled in a rewinding direction 14 by the annealing torque of the break roller 18, the wire electrode 11 generating heat rubs against the surfaces of the chuck part electrodes 20a and 20b which clamp the wire electrode 11 for energization and thereby, the wire metal powder is attached to the surfaces of the chuck part electrodes 20a and 20b. Therefore, if the cutting operation of the wire electrode 11 is repeated a plurality of times (approximately 200 to 300 times), wire metal powder is piled up on the surfaces of the chuck part electrodes 20a and 20b and thereby, the surfaces become rough. If the cutting operation of the wire electrode 11 is performed by the chuck part electrodes 20a and 20b in such state, the wire electrode 11 does not tightly contact with the surfaces of the chuck part electrodes 20a and 20b when current is fed for cutting the wire electrode 11, that is, the contact state between the wire electrode 11 and the surfaces of the chuck part electrodes 20a and 20b is unstable, as shown in FIG. 13. Consequently, chattering occurs and minute discharge frequently happens.

A large number of discharge traces are formed on the surfaces of the chuck part electrodes 20a and 20b due to the minute discharge. As a result, deep scratches of the discharge traces which have been formed on the surfaces of the chuck part electrodes 20a and 20b are transferred to the surface of the wire electrode 11 which has been annealed. The wire electrode 11 to which deep scratches of discharge traces have been transferred causes such problem that scratched part of the wire electrode 11 is frequently clogged at the wire guide parts of an upper die guide 24 and a lower die guide 25 in a wire connecting operation as shown in FIG. 14, substantially decreasing a connection success rate. Especially, when the wire electrode 11 is a soft wire, this problem is conspicuous. Further, though certain amount of wire metal powder is inevitably attached on the surfaces of the chuck part electrodes 20 in a wire cutting device of an annealing method, the device becomes unusable after about 200 to 300 times of cutting in a case where discharge traces have been formed due to minute discharge. Thus, device life is shortened.

SUMMARY OF THE INVENTION

An object of the present invention is to provide a wire-cut electric discharge machine that prevents damage of an energizing electrode and prevents decrease of a success rate of automatic wire connection by preventing generation of wire metal powder when a wire electrode is cut by a wire cutting mechanism.

A wire-cut electric discharge machine according to the present invention includes an upper wire guide and a lower wire guide that respectively guide the wire electrode on upper and lower sides of a workpiece, first wire electrode cutting energizing electrodes that are provided on the upper side of the upper wire guide on a traveling path of the wire electrode, and hold the wire electrode, second wire electrode cutting energizing electrodes that are provided on a lower stream side compared to the first wire electrode cutting energizing electrodes, a tensile force imparting part configured to impart predetermined tensile force to the wire electrode, and a cooling part configured to cool down a part on which the first wire electrode cutting energizing electrodes and the wire electrode contact with each other. And the wire electrode is energized for heating of the wire electrode via the first wire electrode cutting energizing electrodes and the second wire electrode cutting energizing electrodes and, at the same time, the wire electrode is imparted with the tensile force by the tensile force imparting part, so that the wire electrode is cut.

The cooling part may supply compressed air or cooling water.

The cooling part may be a heat pump exchanger.

According to the present invention, a wire-cut electric discharge machine that prevents damage of an energizing electrode and prevents decrease of a success rate of automatic wire connection by preventing generation of wire metal powder when a wire electrode is cut by a wire cutting mechanism can be provided.

BRIEF DESCRIPTION OF THE DRAWINGS

Above-mentioned and other objects and features of the present invention will be apparent from the following embodiment described with reference to the accompanying drawings, in which.

DETAILED DESCRIPTION OF THE PREFERRED EMBODIMENTS

Figure 1:
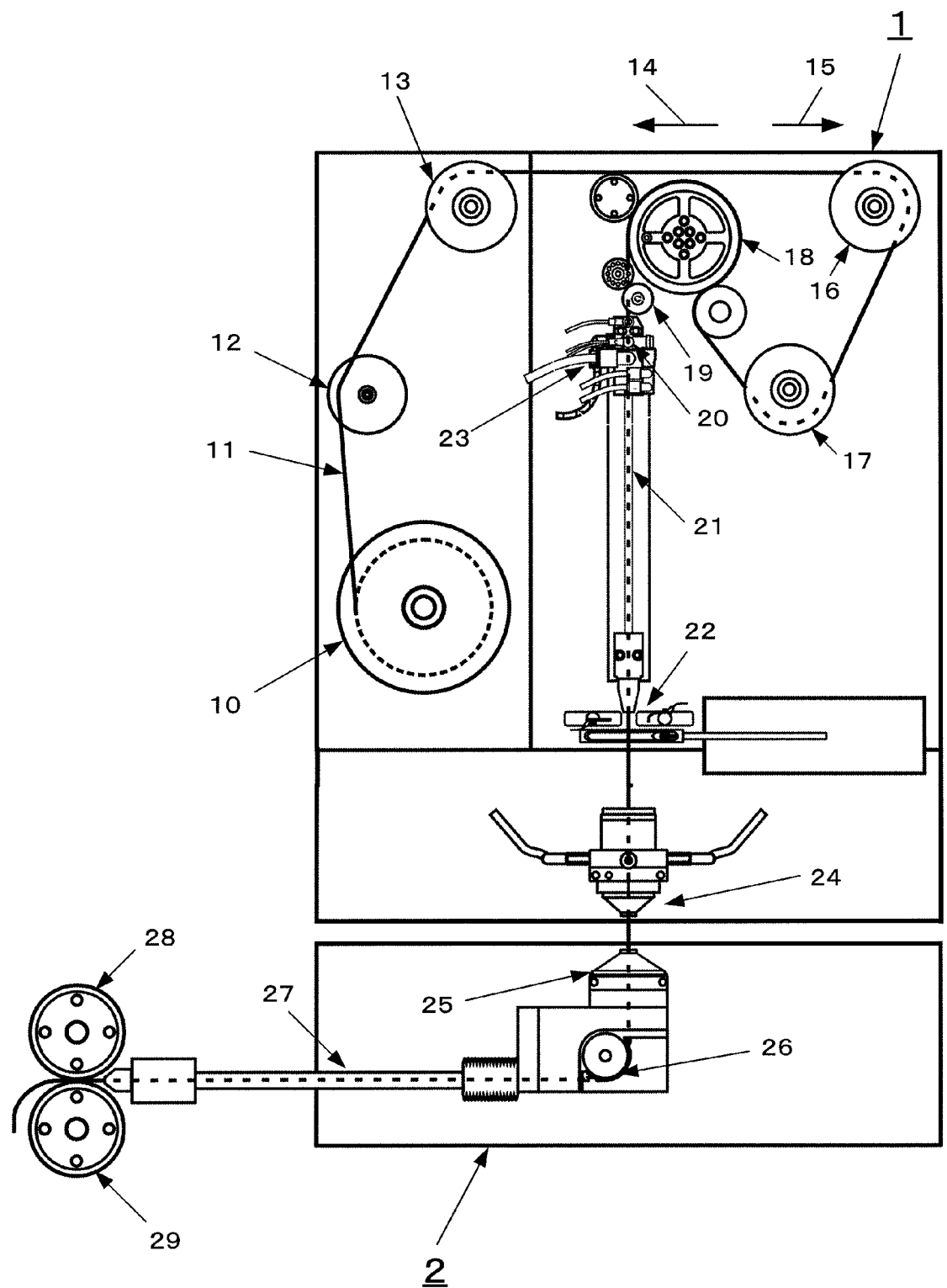
FIG. 1 illustrates an automatic wire electrode feeding mechanism of a wire-cut electric discharge machine.

FIG. 1 illustrates an automatic wire electrode feeding mechanism of a wire-cut electric discharge machine. In FIG. 1, an upper machine casing part 1 and a lower machine casing part 2 are disposed to be opposed to each other.

The upper machine casing part 1 includes a wire bobbin 10, guide rollers 12, 13, 16, and 17, a break roller 18, an upper guide roller 19, chuck part electrodes 20, an upper pipe 21, a detecting part 22, an air blowing device 23, and an upper die guide 24. The lower machine casing part 2 includes a lower die guide 25, a lower guide roller 26, an inductive pipe 27, a pinch roller 28, and a feed roller 29.

The wire electrode 11 pulled out of the wire bobbin 10 is fed to a part between the feed roller 29 and the pinch roller 28 through the guide rollers 12, 13, 16, and 17, the break roller 18, the upper guide roller 19, the upper die guide 24, the lower die guide 25, and the lower guide roller 26.

The break roller 18 is driven by a torque motor (not shown) and breaking is applied to free rotation of the break roller 18. The feed roller 29 is driven by a feed motor (not shown) and allows the wire electrode 11 to travel at a predetermined speed. A workpiece (not shown) is disposed between the upper die guide 24 and the lower die guide 25. Voltage is applied between the wire electrode 11 and the workpiece so as to generate electric discharge at a machining gap between the wire electrode 11 and the workpiece. Thus, the workpiece can be machined in a desired form.

A wire cutting mechanism is composed of the upper pipe 21 which is disposed above the upper die guide 24, the chuck part electrodes 20 which are disposed on an entrance side of the upper pipe 21 and on a traveling path of the wire electrode 11, and the detecting part 22 which is disposed on an exit side of the upper pipe 21. The chuck part electrodes 20 (an energizing side chuck part electrode 20a and a clamping side chuck part electrode 20b) and the electrodes of the detecting part 22 can be moved relative to the wire electrode 11 by a driving part (not shown) such as a solenoid so as to clamp the wire electrode 11 at a desired position. That is, the chuck part electrodes 20 and the electrodes of the detecting part 22 are moved by the driving part to approach the wire electrode 11 in a cutting operation of the wire electrode 11 and are moved away from the wire electrode 11 after the end of the cutting operation of the wire electrode 11.

Figure 2:
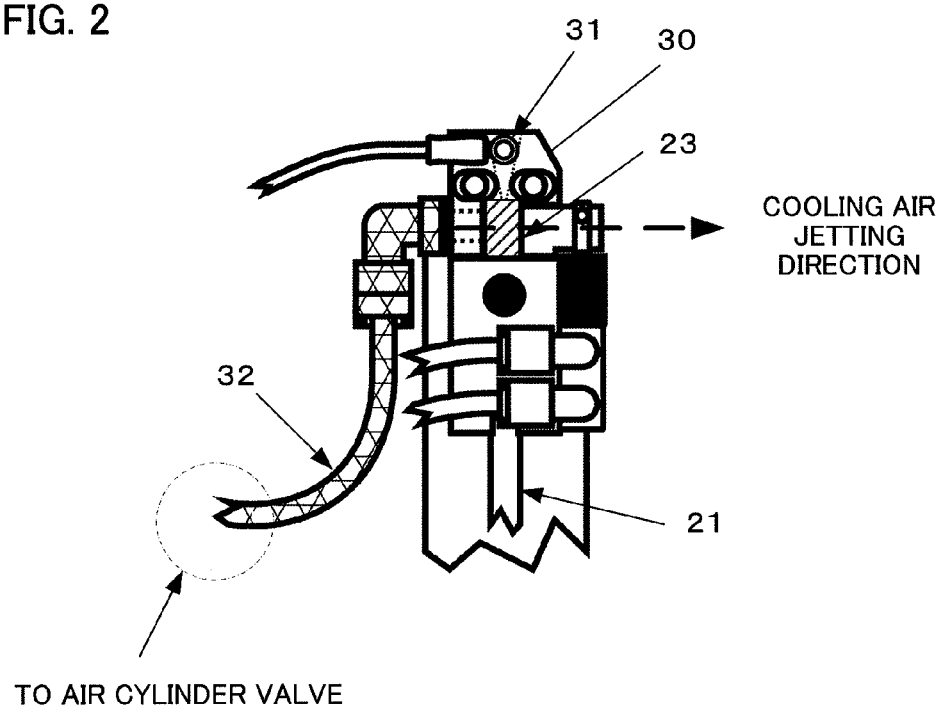
FIG. 2 illustrates an enlarged part to which a chuck part electrode is attached in the automatic wire electrode feeding mechanism of FIG. 1.

FIG. 2 illustrates an enlarged part on which the chuck part electrodes are attached in the automatic wire electrode feeding mechanism of FIG. 1.

In vicinity to the chuck part electrodes 20 at the upstream side, a failure detecting block 30 which detects whether the connecting operation of the wire electrode 11 is successful or not is disposed. This failure detecting block 30 is provided with a failure detecting electrode 31. In order to jet compressed air for cooling to a contact part of the wire electrode 11 and the chuck part electrodes 20, compressed air from an air cylinder valve (not shown) is supplied to the chuck part electrodes 20 via an air pipe 32. One end of the air pipe 32 is connected to a through hole which is formed on the failure detecting block 30 and compressed air for cooling can be jetted to the chuck part electrodes 20 through the through hole. A medium to cool down the wire electrode 11 which contacts with the chuck part electrode 20a and the chuck part electrode 20b may be compressed air or cooling water.

In order to protect the surfaces of the wire electrode 11 and the chuck part electrodes 20 from discharge traces which are generated on the surfaces of the wire electrode 11 and the chuck part electrodes 20 and discharge trace transfer to the wire electrode 11 in the cutting operation of the wire electrode 11 in the wire-cut electric discharge machine illustrated in FIG. 1, the following (3) is performed based on the following perceptions (1) and (2).

(1) Since it is considered that generation of minute discharge is caused by chattering which occurs between the wire electrode 11 which is annealed and generates high heat and the chuck part electrodes 20 having the surface to which wire metal powder attaches, it is desirable to locally suppress an occurrence of minute discharge by a method which does not affect the cutting operation by annealing.

(2) It is efficient to suppress generation of wire metal powder which is a causative agent and reduce attachment of the wire metal powder to the surfaces of the chuck part electrodes 20 so as to suppress an occurrence of minute discharge.

(3) The wire metal powder is generated because the wire electrode 11 which has high heat and has been softened due to the annealing is pulled to the rewinding direction 14 by the break roller 18 and rubs against the surfaces of the chuck part electrodes 20. Therefore, softening of the wire electrode 11 due to excessive annealing is prevented and a contact part of the wire electrode 11 and the surfaces of the chuck part electrodes 20 is locally cooled down.

When annealing for cutting the wire electrode 11 is started, the wire electrode 11 which is clamped by the chuck part electrodes 20 is softened due to heat generation by energization and the wire electrode 11 rubs against the surfaces of the chuck part electrodes 20 due to cutting tension in the winding direction 15, causing a state that metal powder is easily produced. Therefore, the air pipe 32 is provided in vicinity to the chuck part electrodes 20 and air blowing for cooling is directly performed by using the air pipe 32. Thus, the chuck part electrodes 20 and the wire electrode 11 which contacts with the chuck part electrodes 20 are locally cooled down and thus the surface of the wire electrode 11 is hardened, suppressing attachment of wire metal powder to the chuck part electrodes 20.

An air blowing nozzle for cooling directly jets cooling air to the failure detecting block 30 through the through hole, which is formed on a position continuing to a clamp of the chuck part electrodes 20 and a wire path, of the failure detecting block 30. It is desirable that the air blowing device does not jet air continuously but operates only during annealing energization so as to suppress wire shaking and noise, and the air blowing device jets air in conjunction with an air cylinder for clamp opening/closing operation in the chuck part electrodes 20.

The timing of air blow jetting is controlled in conjunction with an opening/closing operation of the air cylinder valve that is controlled by an air solenoid valve, in a cutting operation sequence in energization by a pair of energizing electrodes (namely, the chuck part electrodes 20 and the electrodes of the detecting part 22) which clamp the wire electrode 11 as a fulcrum for generating cutting tension and for energization for annealing of the wire electrode 11. The air cylinder valve for air blowing of the air blowing device is operated by air which is supplied from an air solenoid valve (not shown) to air cylinder valve for energizing electrode closing operation (not shown) and is branched from an air supply pipe. Thus, the valve is opened and the air blow jetting is performed. The air blowing is stopped in synchronization with a stage that the cutting operation is ended and air supply to the air cylinder valve for energizing electrode closing operation is stopped.

As a result of an execution of the air blowing, it was confirmed that attachment of wire metal powder to the chuck part electrodes 20 and an occurrence of minute discharge were substantially suppressed, from a running test. Thus, effectiveness of the invention was verified. For example, in a case of related art in which the air blowing was not performed, an electrode life in an automatic wire connection continuous running test using a standard wire electrode was approximately 200 times. However, after the air blowing of the invention was executed, it was confirmed that the electrode life in the automatic wire connection continuous running test using the standard wire electrode exceeded 2000 times.

The cutting operation of the wire electrode 11 is now described with reference to FIGS. 3 to 8.

Figure 3:
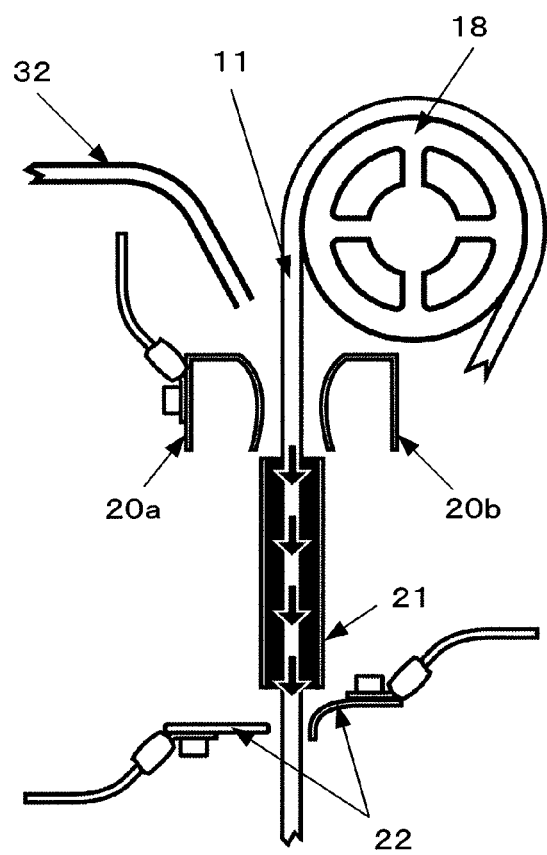
FIG. 3 illustrates a stage on which cutting of a wire electrode is started in the automatic wire electrode feeding mechanism of FIG. 1.

FIG. 3 illustrates a start of cutting of the wire electrode. In order to protect the chuck part electrodes 20 (electrodes 20a and 20b), the air pipe 32 is attached as shown in FIG. 3 so that air discharged from an end of the air pipe 32 may cool down a contact part of the wire electrode 11 and the chuck part electrodes 20 (electrodes 20a and 20b). As a previous stage of the start of cutting of the wire electrode 11, air blowing is started so as to clean the wire electrode 11 and the inside of the upper pipe 21. At this time, the energizing side chuck part electrode 20a and the clamping side chuck part electrode 20b of the chuck part electrodes 20 do not clamp the wire electrode 11, and the pair of detecting electrodes of the detecting part 22 does not clamp the wire electrode 11 either.

Figure 4:
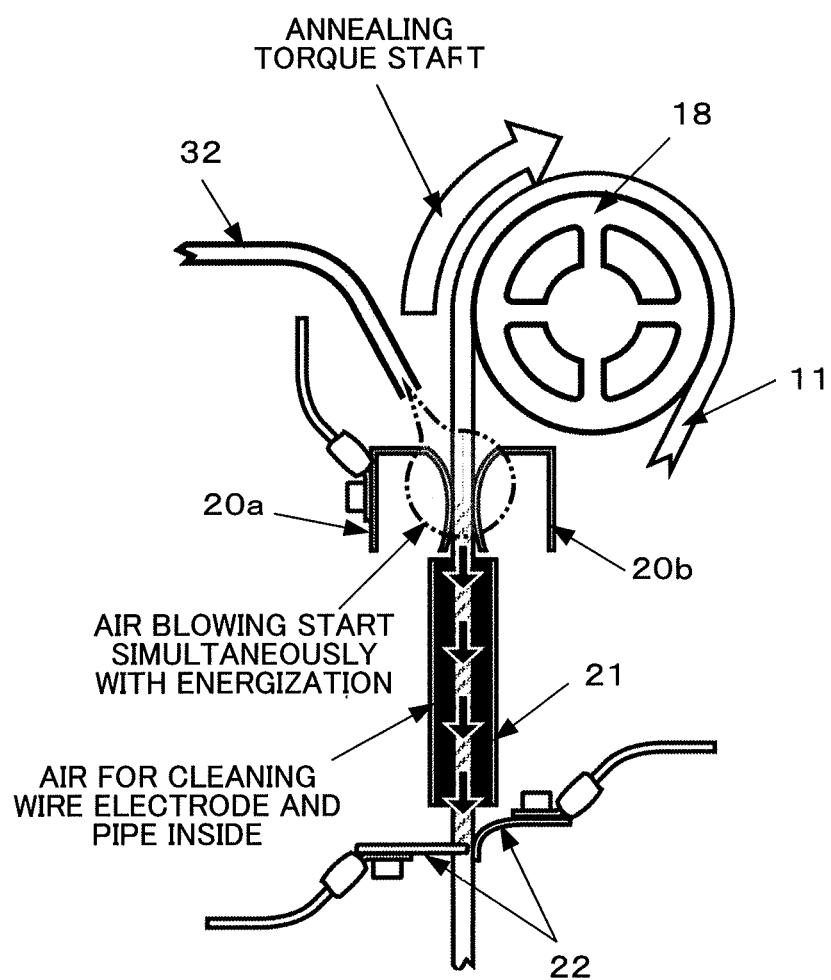
FIG. 4 illustrates a stage on which energization and air blowing are simultaneously started in the automatic wire electrode feeding mechanism of FIG. 1.

FIG. 4 illustrates an air blowing start performed simultaneously with energization. The wire electrode 11 is clamped by the electrodes of the detecting part 22 as well as by the chuck part electrodes 20 (electrodes 20a and 20b). The chuck part electrodes 20 clamp the wire electrode 11 with a relatively movable force with respect to the wire electrode 11 in a state that annealing torque is imparted to the break roller 18 and the wire electrode 11 is pulled. Current for annealing is started to be fed to the chuck part electrodes 20 (electrodes 20a and 20b) and the pair of electrodes of the detecting part 22 via the wire electrode 11. The air blowing with compressed air which is supplied from the air pipe 32 is started so as to locally cool down the contact part of the wire electrode 11 and the chuck part electrodes 20 (electrodes 20a and 20b) simultaneously with the annealing energization start. Tensile force is imparted to the wire electrode 11 in the rewinding direction by the rotary torque of the break roller 18, simultaneously with the annealing energization start. Here, during the energization for annealing, cleaning air supply to the inside of the upper pipe 21 is stopped so as to control a cutting position and straightness of the wire electrode 11, and the wire electrode 11 is cooled down by cutting air.

Figure 5:
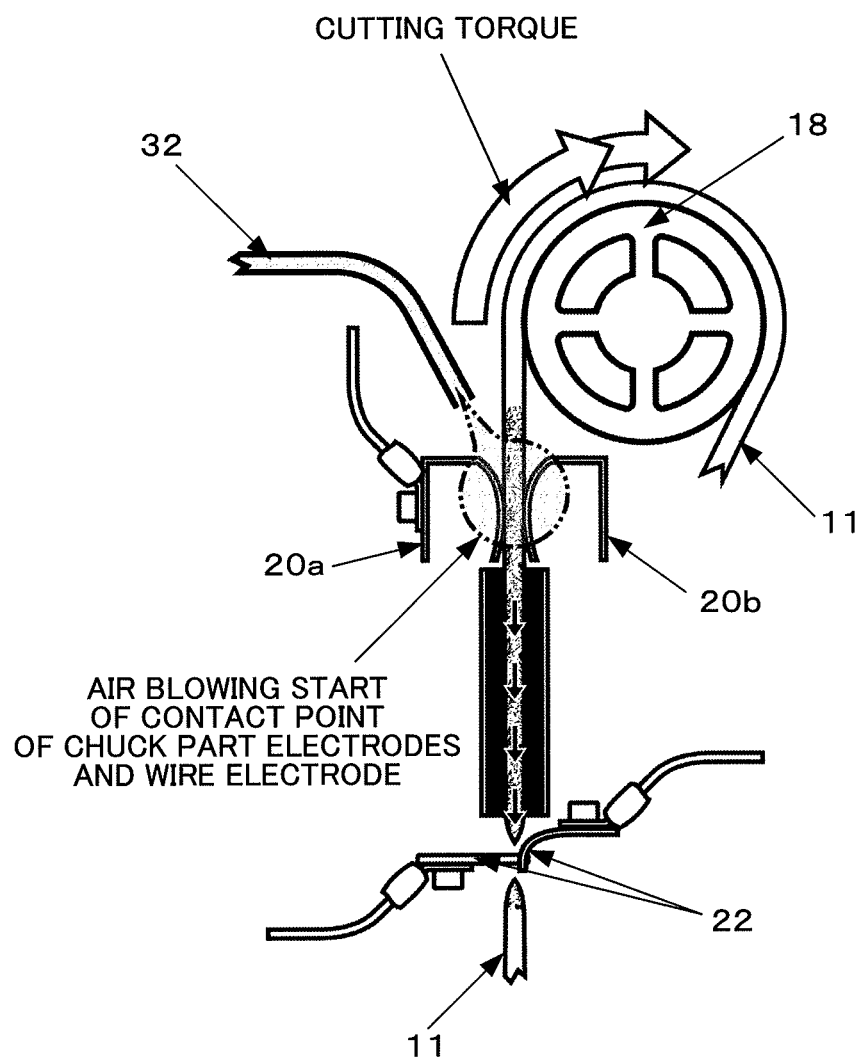
FIG. 5 illustrates a stage from a start of annealing to the cutting of the wire electrode and a stage on which the air blowing is continued in the automatic wire electrode feeding mechanism of FIG. 1.

FIG. 5 illustrates a process from the annealing start to cutting and continuation of the air blowing. The force to pull the wire electrode 11 is switched from the annealing torque to the cutting torque. The cutting torque is rotary torque of the break roller 18 for imparting a force for pulling the wire electrode 11 to cut the wire electrode 11. The cutting torque is imparted by controlling the rotary torque of the break roller 18 in a manner to pull the wire electrode 11 in the rewinding direction, as is the case with the annealing torque. The cutting torque is larger than the annealing torque. The wire electrode 11 is wound by the cutting torque and is cut at a part on which the pair of electrodes of the detecting part 22 is positioned.

Almost all part of the wire electrode 11 at a part between the chuck part electrodes 20 and the electrodes of the detecting part 22 penetrates through the inside of the upper pipe 21 and is cooled down by the cutting air which flows inside the upper pipe 21. Therefore, the wire electrode 11 is not cut inside the upper pipe 21 and is cut at the part of the detecting part 22. The air blowing is continued by supplying compressed air from the air pipe 32 during the energization and thus the contact part of the wire electrode 11 and the chuck part electrodes 20 is locally cooled down. Thus, the contact part of the wire electrode 11 and the chuck part electrodes 20 is locally cooled down by the air blowing, so that this cooled part of the surface of the wire electrode 11 is hardened. Consequently, generation of wire metal powder is suppressed even though the wire electrode 11 rubs against the chuck part electrodes 20.

Figure 6:
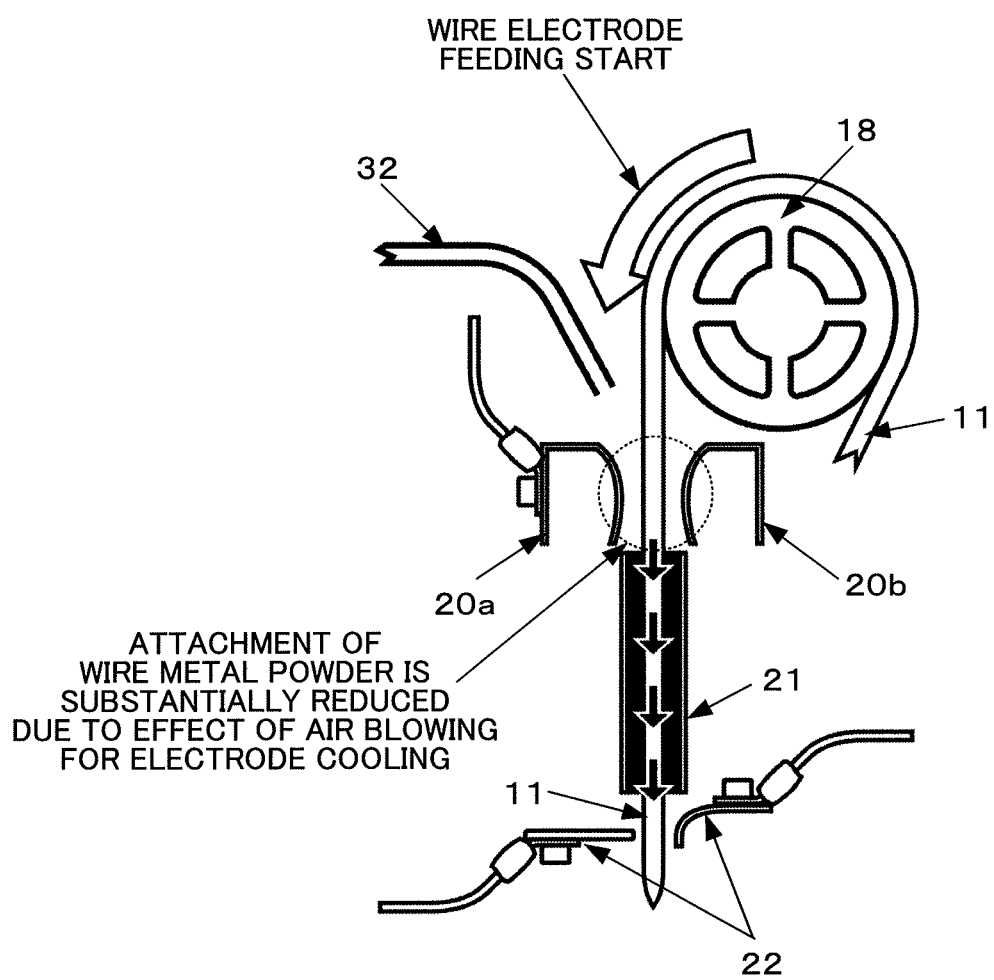
FIG. 6 illustrates a stage on which connection of the wire electrode is started after an end of the cutting of the wire electrode to a stage on which the air blowing is ended in the automatic wire electrode feeding mechanism of FIG. 1.

FIG. 6 illustrates a process from a cutting end to a connection start of the wire electrode 11 and an air blowing end. Simultaneously with the completion of the cutting of the wire electrode 11, supply of the compressed air from the air pipe 32 is stopped to end the local cooling of a part, which contacts with the chuck part electrodes 20, of the wire electrode 11. When the cutting of the wire electrode 11 is ended, wire feeding of the wire electrode 11 is performed in the winding direction 15 and a connecting operation of the wire electrode 11 is started. The wire metal powder from the wire electrode 11 is prevented from attaching to the chuck part electrodes 20 by locally cooling down the part, which contacts with the chuck part electrodes 20, of the wire electrode 11 by the compressed air supplied from the air pipe 32.

In the above-described embodiment of the present invention, compressed air or cooling water is applied to the contact part of the wire electrode 11 and the chuck part electrodes 20 as a cooling medium so as to locally cool down the contact part. The method for cooling down the contact part is not limited to this method. For example, the chuck part electrodes 20 may be cooled down by arranging a heat pump in the failure detecting block 30.

Figure 7:
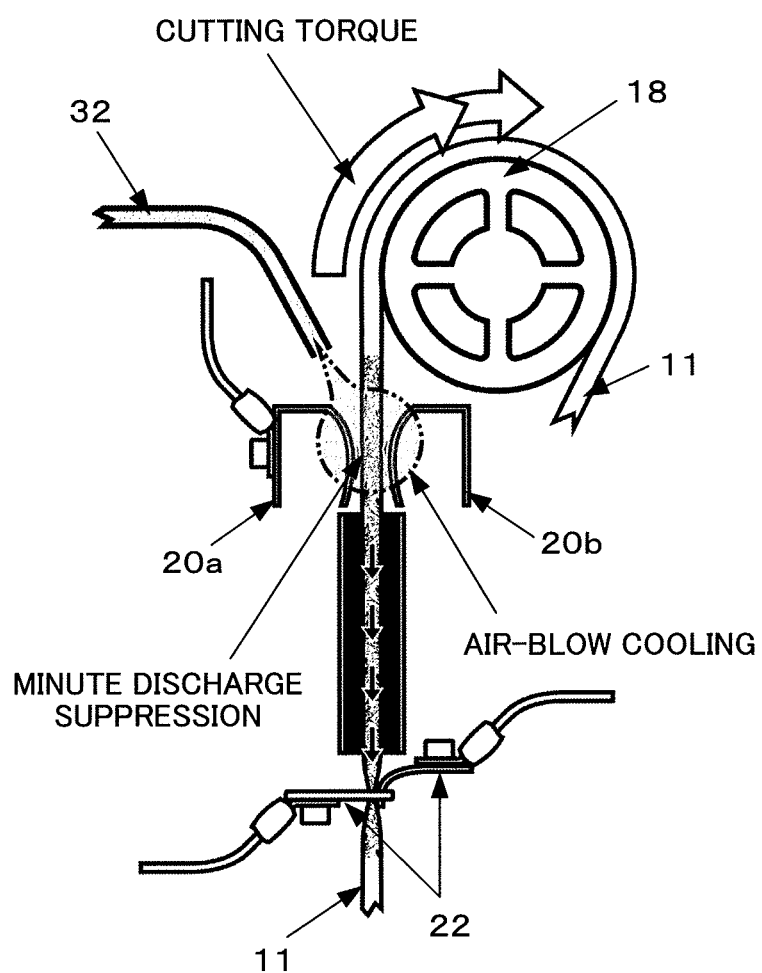
FIG. 7 illustrates suppression of attachment of metal powder on the wire electrode and suppression of an occurrence of minute discharge in the automatic wire electrode feeding mechanism of FIG. 1.

FIG. 7 illustrates suppression of attachment of metal powder to the wire electrode and suppression of an occurrence of minute discharge. When the wire electrode 11 which has been annealed is pulled to the rewinding direction 14 by the break roller 18, the surface of the wire electrode 11 is hardened by performing the air blowing with compressed air. Therefore, even if the wire electrode 11 generating heat rubs against the chuck part electrodes 20 (the energizing side chuck part electrode 20a and the clamping side chuck part electrode 20b) which clamp the wire electrode 11 for energization, an amount of the wire metal powder attaching to the chuck part electrodes 20 can be substantially reduced. Accordingly, even if the cutting operation is repeated number of times, the wire metal powder derived from the wire electrode 11 does not pile on the surfaces of the chuck part electrodes 20, and therefore rough unevenness is not formed on the surfaces of the chuck part electrodes 20. If the cutting operation is performed on the electrode surfaces of the chuck part electrodes 20 in such state, the wire electrode 11 tightly contacts with the electrode surfaces of the chuck part electrodes 20 in the cutting current feeding. Thus, the wire electrode 11 stably contacts with the surfaces of the chuck part electrodes 20, so that chattering does not occur and an occurrence of minute discharge is suppressed.

Figure 8:
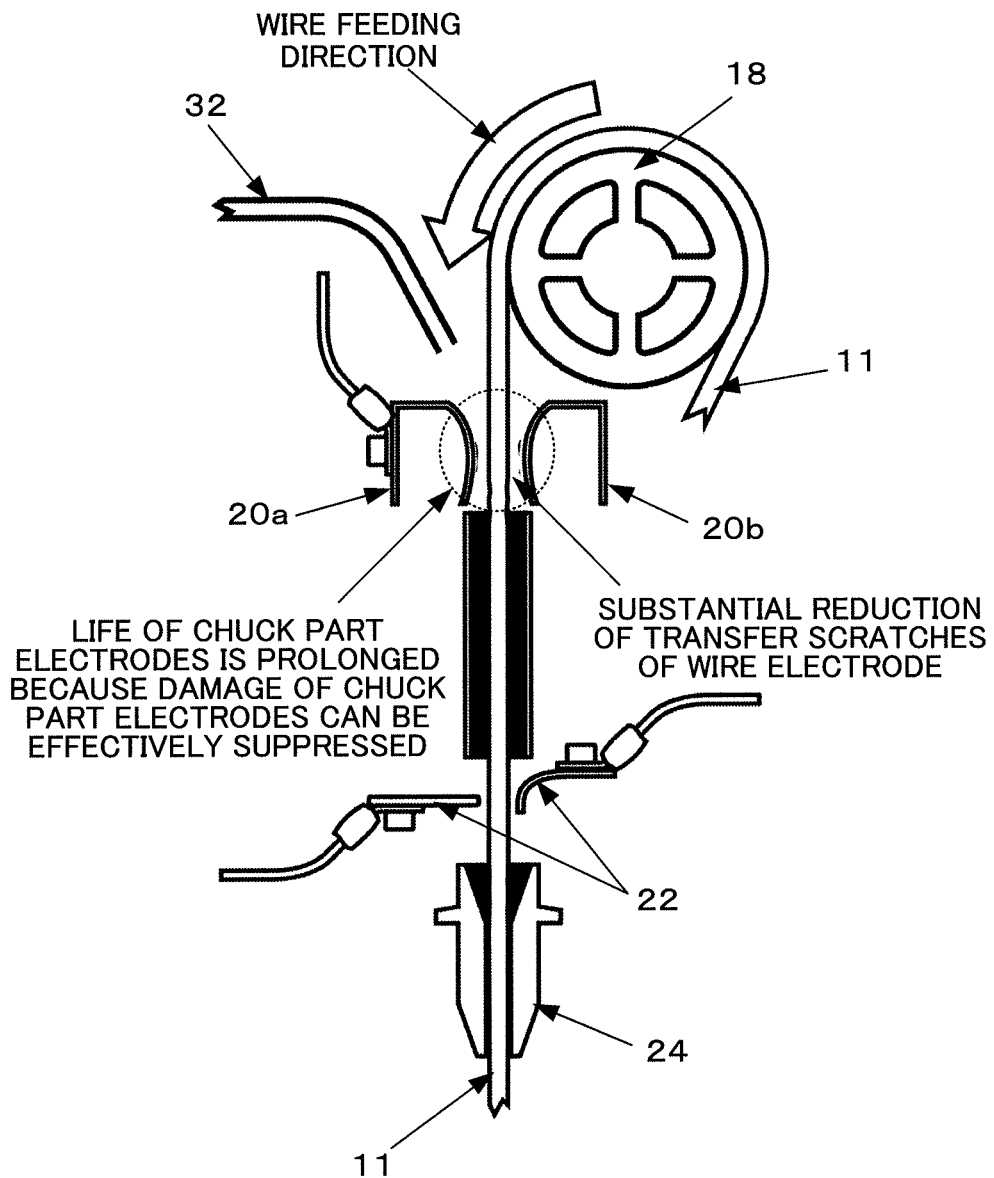
FIG. 8 illustrates that damage of the wire electrode can be suppressed in the automatic wire electrode feeding mechanism of FIG. 1.
Figure 9:
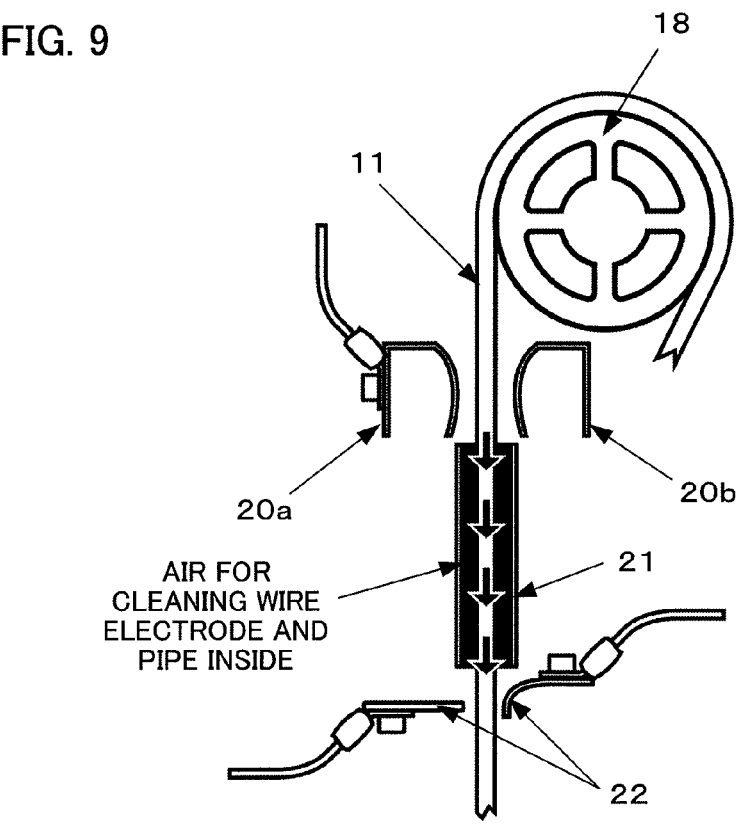
FIG. 9 illustrates that cutting of a wire electrode is started in an automatic wire electrode feeding mechanism of related art.
Figure 10:
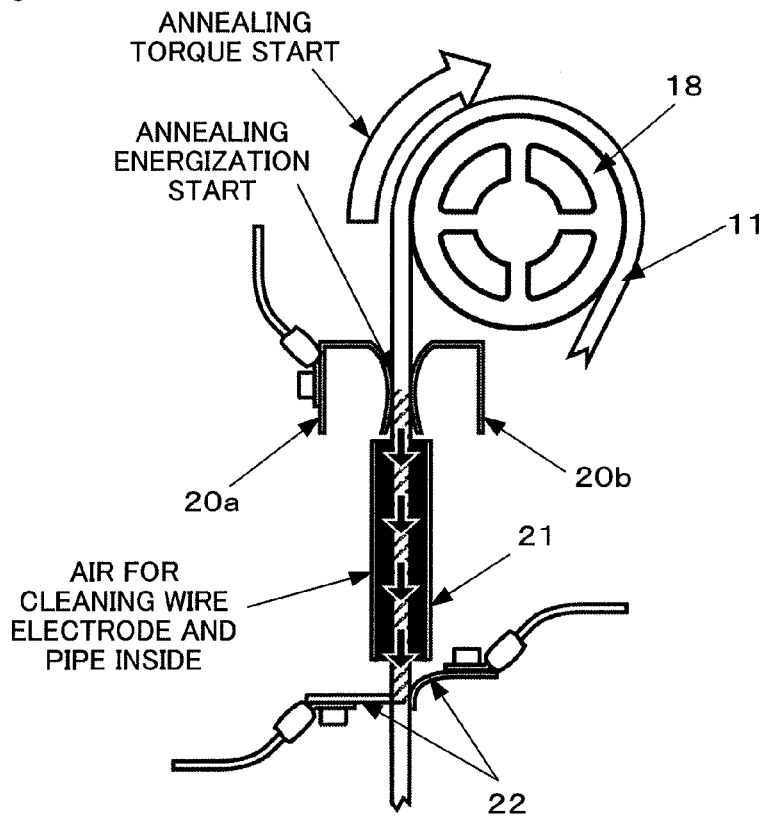
FIG. 10 illustrates that energization for annealing is started in the automatic wire electrode feeding mechanism of FIG. 9.
Figure 11:
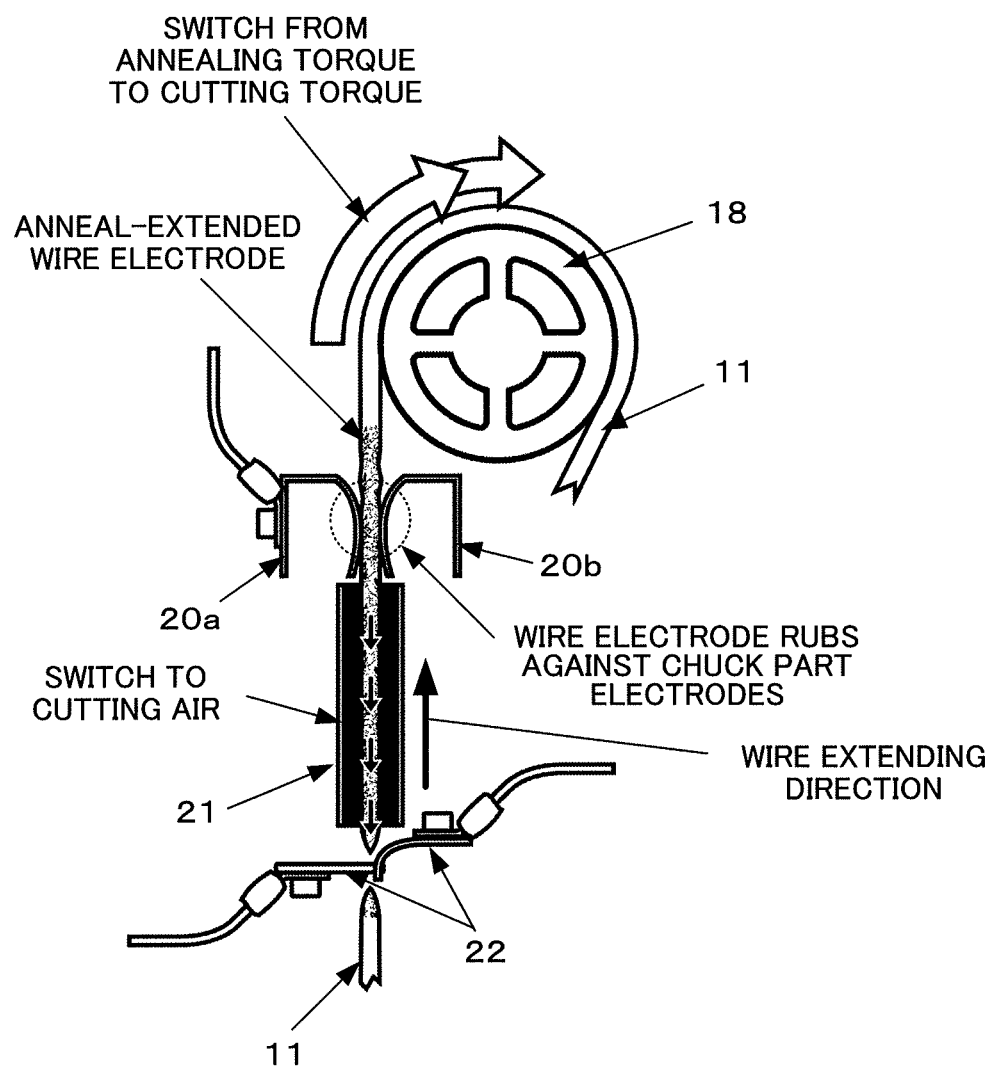
FIG. 11 illustrates a stage from a start of the annealing to cutting in the automatic wire electrode feeding mechanism of FIG. 9.
Figure 12:
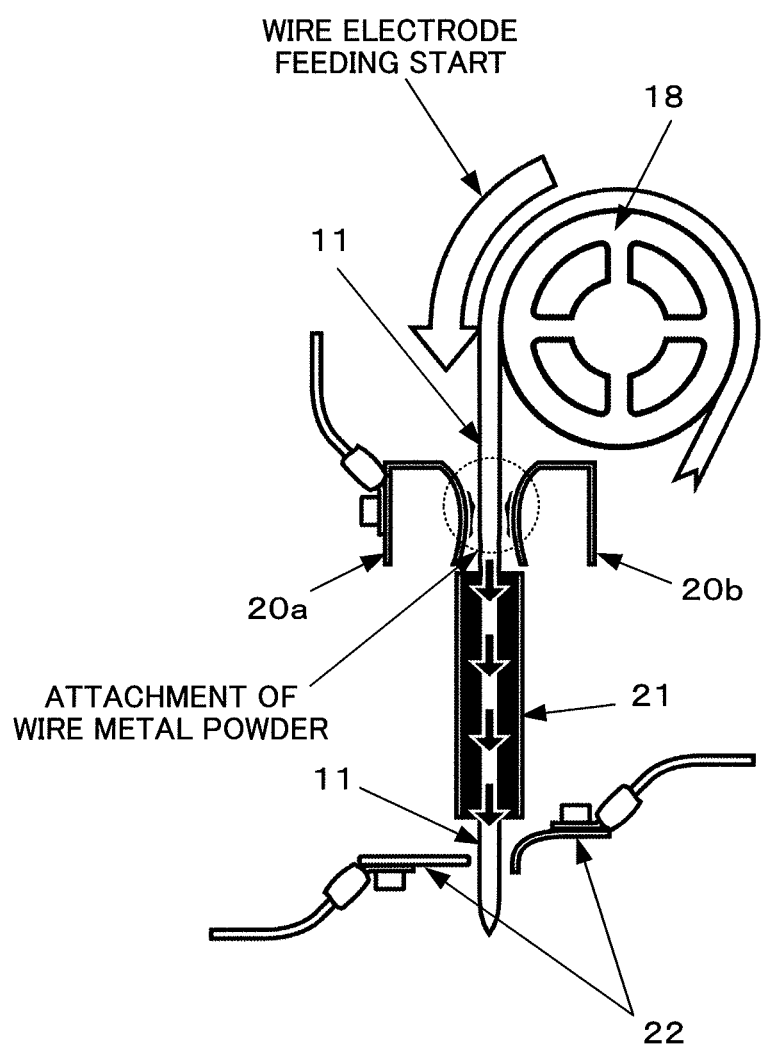
FIG. 12 illustrates a stage from an end of the cutting of the wire electrode to a start of connection of the wire electrode in the automatic wire electrode feeding mechanism of FIG. 9.
Figure 13:
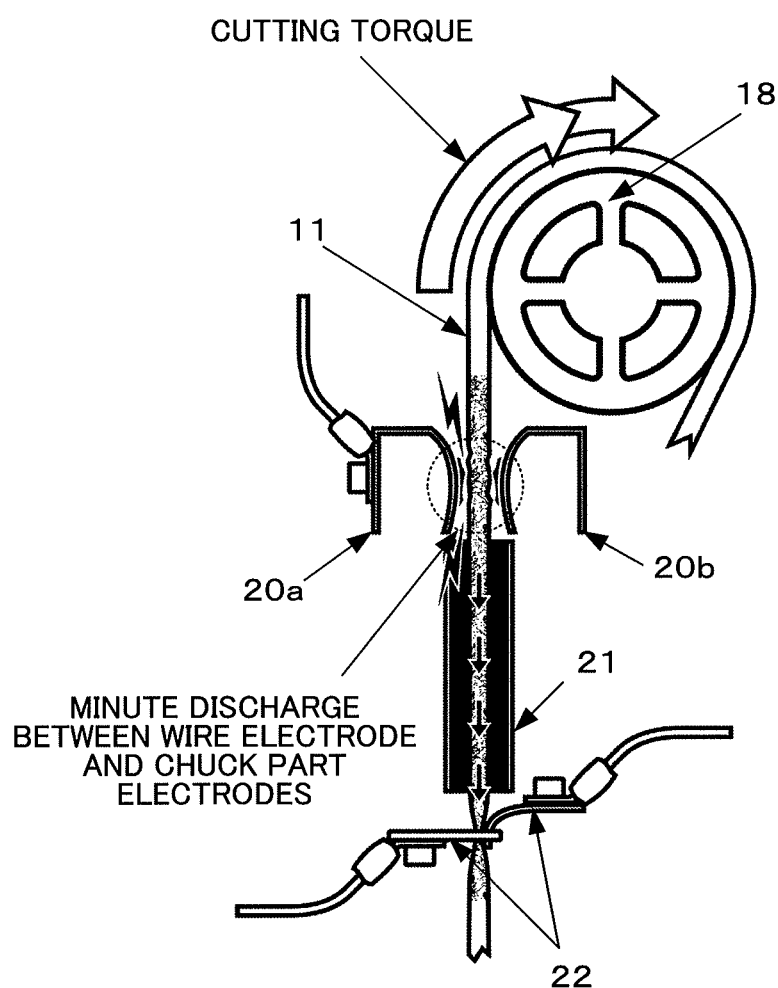
FIG. 13 illustrates an occurrence of minute discharge in the annealing in the automatic wire electrode feeding mechanism of FIG. 9.
Figure 14:
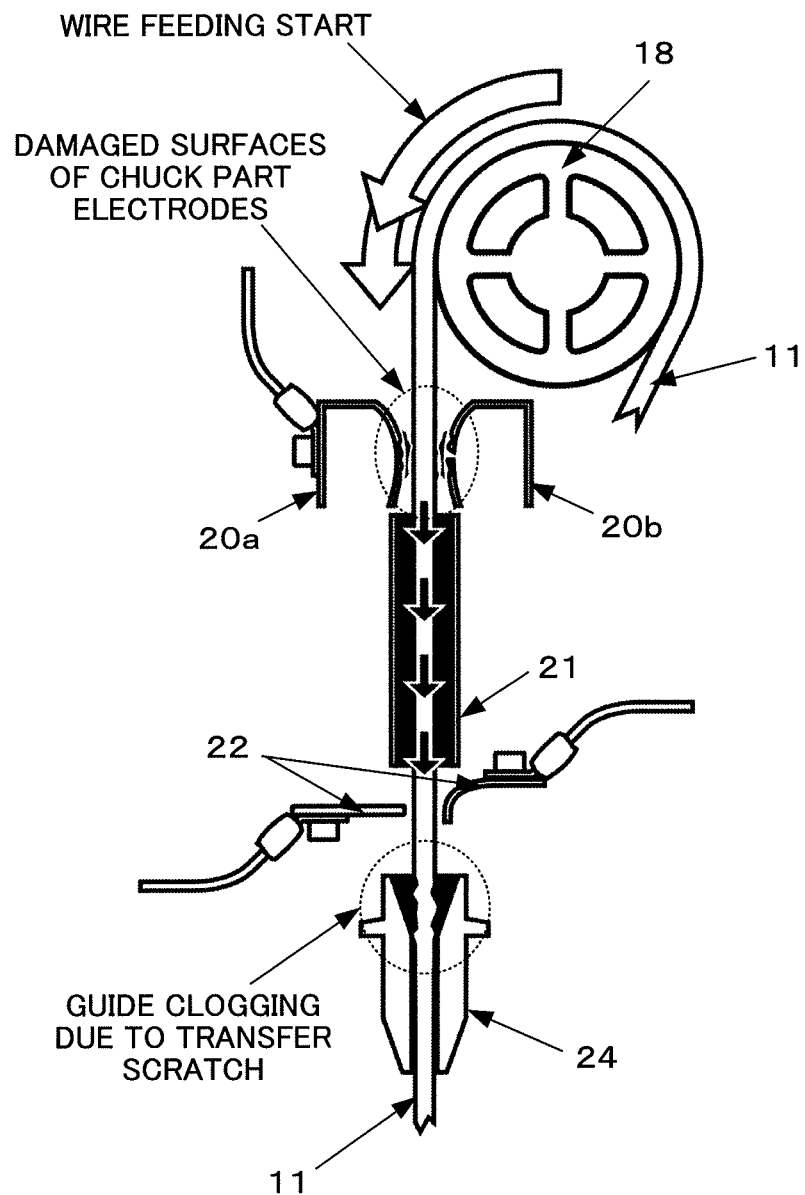
FIG. 14 illustrates damage of the wire electrode and an occurrence of guide clogging in the automatic wire electrode feeding mechanism of FIG. 9.

FIG. 8 illustrates that damage of the wire electrode according to the invention can be suppressed. A number of discharge traces caused by minute discharge are not formed on the electrode surfaces of the chuck part electrodes 20 and thus electrode damage of the chuck part electrodes 20 is efficiently suppressed. Accordingly, the life of the chuck part electrodes 20 can be prolonged and transfer of the discharge traces to the surface of the wire electrode 11 which has been annealed can be reduced.

The invention claimed is:

1. A wire-cut electric discharge machine having a function of cutting a wire electrode, the wire-cut electric discharge machine comprising:

an upper wire guide and a lower wire guide configured to guide the wire electrode on upper and lower sides of a workpiece, respectively;

a pair of first wire electrode cutting energizing electrodes provided on an upper side of the upper wire guide on a traveling path of the wire electrode and configured to clamp the wire electrode at a first portion;

a pair of second wire electrode cutting energizing electrodes provided on the upper side of the upper wire guide on the traveling path of the wire electrode and on a downstream side of the first wire electrode cutting energizing electrodes and configured to clamp the wire electrode at a second portion;

a tensile force imparting part configured to impart a predetermined tensile force to the wire electrode; and a cooling part configured to cool down the first portion wherein the first wire electrode cutting energizing electrodes and the second wire electrode cutting energizing electrodes are configured to energize the wire electrode, and the tensile force imparting part is configured to impart the tensile force to the wire electrode while the wire electrode is being energized by the first wire electrode cutting energizing electrodes and the second wire electrode cutting energizing electrodes.

2. The wire-cut electric discharge machine according to claim 1, wherein the cooling part is configured to supply compressed air.

3. The wire-cut electric discharge machine according to claim 1, wherein the cooling part is configured to supply cooling water.

4. The wire-cut electric discharge machine according to claim 1, wherein the cooling part includes a heat pump exchanger.

5. The wire-cut electric discharge machine according to claim 1, wherein the tensile force imparting part is configured to impart the tensile force along a direction of the traveling path of the wire electrode.

6. The wire-cut electric discharge machine according to claim 1, wherein the wire electrode is cut at the second portion.

7. The wire-cut electric discharge machine according to claim 1, wherein the cooling part is configured to cool the first portion only when the wire electrode is heated by being clamped and energized by the first wire electrode cutting energizing electrodes.

8. The wire-cut electric discharge machine according to claim 1, wherein the cooling part is configured to stop cooling the first portion when cutting of the wire electrode is completed.

9. The wire-cut electric discharge machine according to claim 1, wherein the cooling part is configured not to cool the first portion when the wire electrode is not claimed by the first wire electrode cutting energizing electrodes.

* * * * *